W. C. POST.
TIRE.
APPLICATION FILED DEC. 14, 1915.
1,219,350.
Patented Mar. 13, 1917.
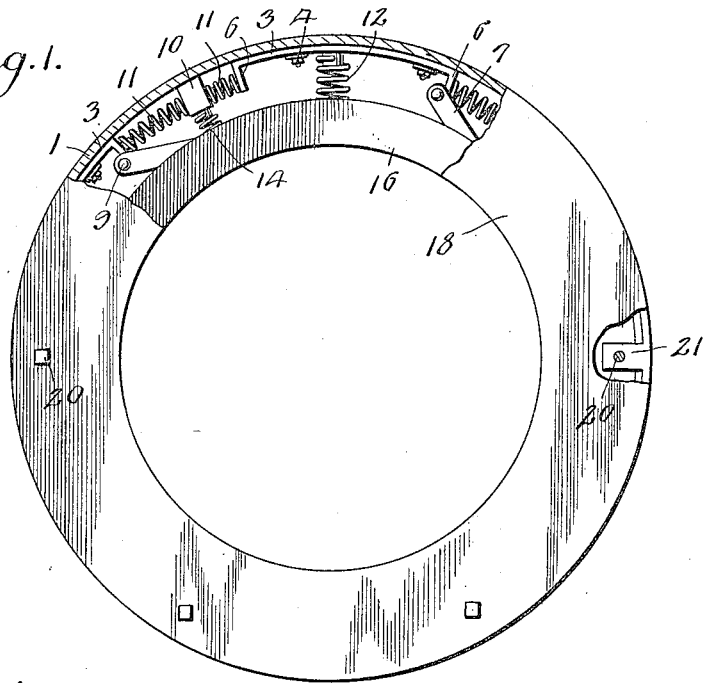
Fig. 1.
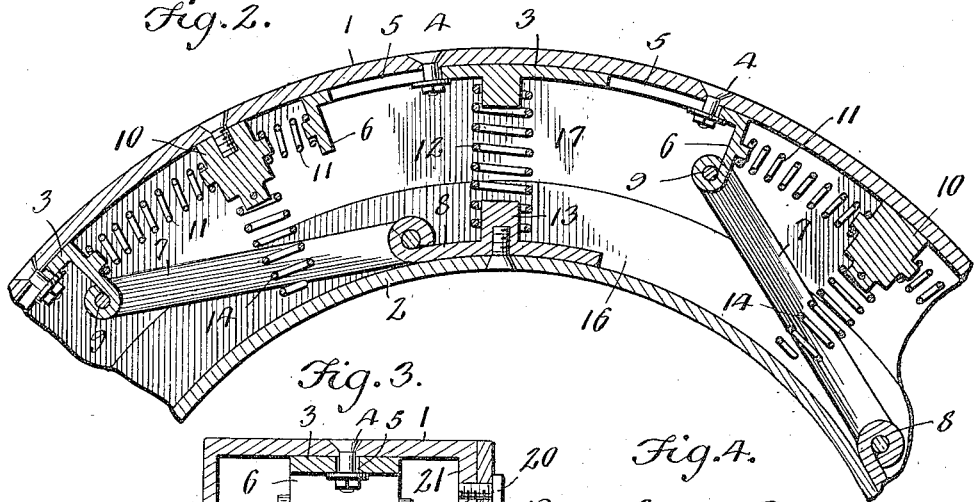
Fig. 2.
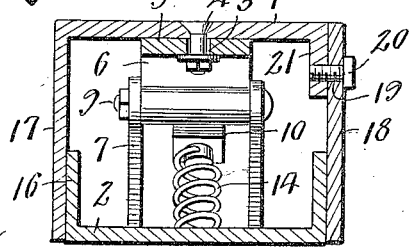
Fig. 3.
Fig. 4.
Inventor
W. C. Post,
By Victor J. Evans
Attorney
Witnesses

UNITED STATES PATENT OFFICE.

WILLIAM C. POST, OF BREWSTER, MINNESOTA.

TIRE.

1,219,350.  Specification of Letters Patent.  Patented Mar. 13, 1917.

Application filed December 14, 1915. Serial No. 66,792.

*To all whom it may concern:*

Be it known that I, WILLIAM C. POST, a citizen of the United States, residing at Brewster, in the county of Nobles and State of Minnesota, have invented new and useful Improvements in Tires, of which the following is a specification.

This invention relates to tires especially designed for use on large and heavy cars such as trucks used in hauling freight, the object in view being to dispense with the ordinary rubber tire either of the cushion or pneumatic type now in common use and to substitute therefor an all metal tire embodying cushioning means for absorbing the ordinary road shocks and vibrations and preventing the transmission of the same to the axles and body of the vehicle.

With the above and other objects in view, the invention consists in the novel construction, combination and arrangement of parts, as herein described, illustrated and claimed.

In the accompanying drawings:—

Figure 1 is a side elevation partly broken away of a tire embodying the present invention.

Fig. 2 is an enlarged fragmentary longitudinal section through the same.

Fig. 3 is a cross section thereof.

Fig. 4 is a detail view of one of the stress distributing members.

The tire contemplated in this invention comprises an outer annular hoop or band 1, and an inner annular hoop or band 2, the said parts being arranged in spaced and normally concentric relation to each other as indicated in Fig. 1.

Interposed between the inner and outer members 1 and 2 are cushioning means which will now be described. Stress distributing members 3 of arcuate shape and corresponding approximately in curvature to the inner periphery of the member 1, are secured to the last named member to bear against the inner surface thereof by means of headed studs or bolts 4 which pass through slots 5 extending longitudinally of the members 3, whereby the last named members are adapted to slide longitudinally of the inner face of the outer hoop or band 1 and are maintained in sliding engagement therewith. Each of the members 3 is provided with inwardly extending end portions or lips 6 the purpose of which will presently appear.

Draft links 7 are pivotally connected at one end to the clips 8 fastened to the outer surface of the inner band or hoop 2 and said draft links are pivotally connected at their opposite ends as shown at 9 to one of the inturned end portions or lips 6 of the adjacent stress distributing member 3.

Abutment blocks 10 are secured to the inner face of the outer band or hoop 1 at points intermediate the members 3 and between each block 10 and the adjacent lips 6 of the members 3, coiled cushioning springs 11 are interposed. Other radially disposed coiled compression springs 12 are interposed between the outer face of the inner band or hoop 2 and the members 3, the latter being provided with projections 13 to maintain the engagement between the last named springs and said stress distributing members. Auxiliary cushioning compression springs 14 are interposed between the blocks 10 and the outer surface of the inner band or hoop 2 but the last named springs terminate short of the inner band 2 and therefore are brought into use only when the tire is subjected to an unusually heavy load or shock.

The inner hoop or band 2 is provided at the opposite sides thereof with outwardly extending flanges 16 and the outer band or hoop 1 is provided at one side with an integrally formed inwardly extending flange 17 while it is provided at its opposite side with a detachable inwardly extending flange 18 the same being provided with holes 19 to receive screws or bolts 20 which are inserted therethrough and into threaded holes in inwardly extending lugs or ears 21 secured to the inner face of the band or hoop 1. This enables the detachable flange 17 to be removed for the purpose of inspecting or repairing the cushioning means between the outer and inner hoops or bands.

From the foregoing description, taken in connection with the accompanying drawings, it will now be understood that the inner band or hoop 2 is supported by the radially disposed coiled springs and also by the springs which extend longitudinally of the tire and are interposed between the blocks 10 and the lips 3. As the inner band 2 is pressed downwardly by the weight imposed on the axle and wheel, the stress distributing links 7 are moved substantially in the direction of their length thereby imparting a sliding movement to the stress distributing members, the sliding movement thereof being resisted by the springs last referred to. As this takes place throughout the circumference of the tire it will be seen that the stress on the longitudinally disposed springs is distributed and they all therefore mutually assist each other in resisting the relative movement between the inner and outer bands or hoops, thereby absorbing road shocks and vibrations.

The side flanges of the inner and outer bands bear an overlapping and sliding relation to each other so as to house in the cushioning means and exclude foreign matter.

Having thus described my invention, I claim:—

In a spring tire, normally concentric outer and inner hoops, arcuate stress distributing members slidable to a limited extent circumferentially of and in contact with the inner face of the outer hoop and attached thereto, draft links pivotally connected at one end with the inner hoop and pivotally connected at their opposite ends to the stress distributing members, all of said draft links being inclined in the same direction, blocks having a fixed relation to the inner face of the outer hoop, cushioning springs extending circumferentially of the tire and interposed between each block and the ends of adjacent stress distributing members, radially disposed springs interposed between said blocks and the inner hoop, and other radially disposed springs attached at their outer ends to said stress distributing members and supported at their inner ends by said inner band.

In testimony whereof I affix my signature in presence of two witnesses.

WILLIAM C. POST.

Witnesses:
EAGRIMS TAD,
T. D. MITCHELL.

Copies of this patent may be obtained for five cents each, by addressing the "Commissioner of Patents, Washington, D. C."